(12) United States Patent
Pigott et al.

(10) Patent No.: US 7,058,149 B2
(45) Date of Patent: Jun. 6, 2006

(54) SYSTEM FOR PROVIDING A CALIBRATED CLOCK AND METHODS THEREOF

(75) Inventors: John Pigott, Phoenix, AZ (US); Thomas Jeffrey Reiter, Dearborn, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 1011 days.

(21) Appl. No.: 10/017,688

(22) Filed: Dec. 14, 2001

(65) Prior Publication Data

US 2003/0112906 A1      Jun. 19, 2003

(51) Int. Cl.
*H04L 7/00* (2006.01)

(52) U.S. Cl. .................................... 375/354
(58) Field of Classification Search ............. 375/343, 375/345, 354; 379/93.31; 331/46
See application file for complete search history.

(56) References Cited

U.S. PATENT DOCUMENTS

| 5,117,756 A | 6/1992 | Goffin, II |
| 5,416,435 A | 5/1995 | Jokinen et al. |
| 5,644,261 A * | 7/1997 | Frisch et al. ............ 327/277 |
| 5,748,570 A | 5/1998 | Komoda |
| 5,767,747 A | 6/1998 | Pricer |
| 5,831,485 A * | 11/1998 | Nelson et al. ............ 331/47 |
| 6,226,231 B1 * | 5/2001 | Kattan .................... 368/113 |
| 6,304,517 B1 | 10/2001 | Ledfelt et al. |
| 6,621,767 B1 * | 9/2003 | Kattan .................... 368/113 |
| 6,871,292 B1 * | 3/2005 | Fischer ................... 713/500 |

FOREIGN PATENT DOCUMENTS

| EP | 0566398 A2 | 4/1993 |
| WO | WO 01/61898 A2 | 8/2001 |
| WO | WO 01/95550 A2 | 12/2001 |

OTHER PUBLICATIONS

An Analysis of the i2164, dated Sep. 1981.

* cited by examiner

*Primary Examiner*—Emmanuel Bayard
*Assistant Examiner*—Lawrence Williams

(57) ABSTRACT

A system and methods are provided for calibrating timing in a remote device to timing in a source device. The source device dictates timing signals to be generated in the remote device. A calibration routine is processed to calibrate timing in the remote device to timing in the source device. The source device provides a reference signal that dictates a period of time to the remote device. The remote device tracks a number of local clock cycles generated for the duration of the dictated period of time. The remote device then establishes a time base for translating a number of clock cycles dictated by the source device to a number of clock cycles generated within the remote device.

40 Claims, 6 Drawing Sheets

SYSTEM FOR PROVIDING A CALIBRATED CLOCK AND METHODS THEREOF

FIELD OF THE DISCLOSURE

The present invention relates generally to data processing systems and more specifically to calibrating data processing devices with respect to time.

BACKGROUND

Data processing devices are often used to control clock dependent functions, such as the transmission of data in communication systems and the control of specific functions in control systems. For example, a control system can be used to control a motor assembly or the duration and/or timing of specific events. In systems having multiple processing devices, it is often necessary to calibrate devices so that one device can indicate to another device when, or how long, an event is to occur. If the devices are not calibrated in some manner, there is little guarantee that the desired time event will be realized as expected. In one embodiment, the devices are calibrated by using a common clock. However, devices with a common clock generally require dedicated hardware, such as clock drivers and clock signal pins, to receive a clock signal from the common clock among the devices.

In another prior-art solution, clocks of devices within a data processing system are calibrated by trimming the devices to meet a specific time requirement. In such a data processing system, the devices are allowed to run asynchronously, eliminating a need for a common clock signal, as well as dedicated clock drivers and pins to support the common clock signal. However, the clocks within the devices may still deviate with temperature, and require the devices to be trimmed during production to improve calibration. It is costly to maintain and trim devices during production for calibration purposes.

From the above discussion it should be apparent that an improved method of calibrating timing in a remote device to a main device is needed.

BRIEF DESCRIPTION OF THE DRAWINGS

Specific embodiments of the present disclosure are shown and described in the drawings presented herein. Various objects, advantages, features and characteristics of the present disclosure, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present invention provides a method for calibrating timing in a remote device to timing in a source, or control, device. The method includes receiving, at the remote device, a time reference signal from the source device. The time reference signal provides a timing event that corresponds to a predefined amount of time. For example, a remote device can be calibrated to the source device by receiving a time reference signal, such as a pulse, that is predefined to correlate to a specific amount of time, i.e. eight microseconds. Accordingly, the remote device correlates the duration of the timing event (pulse) of the time reference signal with its own internal clock. For example, the remote device can measure a number of internal clock cycles that occur during the timing event. Accordingly, the remote device can now associate its internal clock to a time base that is common with the system device. Subsequently, the remote device can translate control signals received from the source device that correlate to the time base to assert control signals that control functions on a target device, and be assured the remote device is appropriately calibrated to the source device.

Figure 1:
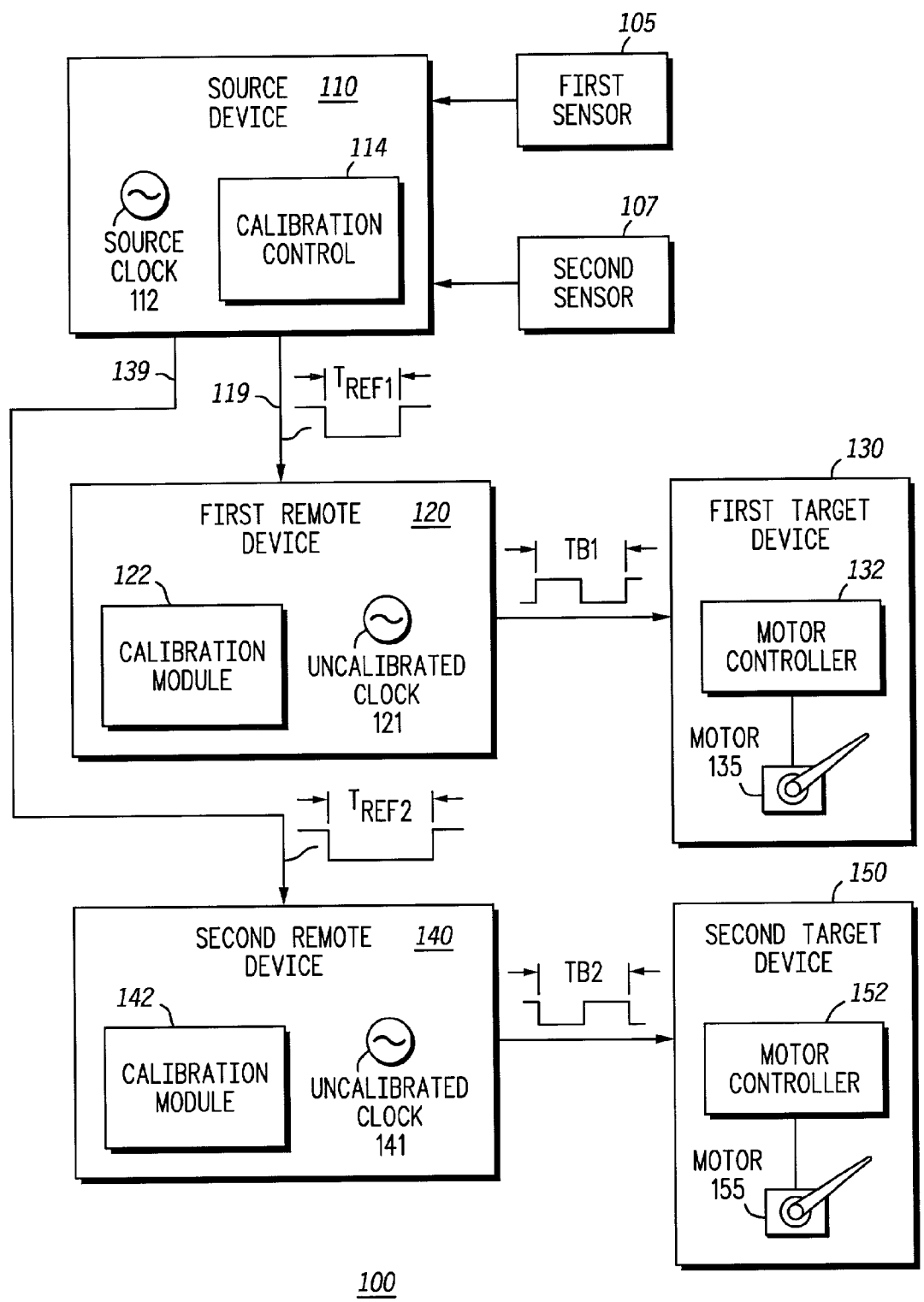
FIG. 1 is a block diagram illustrating a system for calibrating a clock in a remote device for controlling a target device, according to one embodiment of the present invention.

Referring now to FIG. 1, a block diagram illustrating a specific embodiment of the preset invention for calibrating one or more remote devices to a source device for controlling target devices is shown and referenced generally as system 100, according to one embodiment of the present invention. A source device 110 controls functionality to be performed by target device 130 by providing data, such as command data, over communication nodes 119 to the remote device 120, wherein remote device 120 provides a control interface with the target device 130. Likewise, source device 110 controls functionality to be performed by second target device 150 by providing data, such as command data, over communication nodes 139 to the remote device 140, wherein remote device 140 provides a control interface with the target device 150.

Prior to executing control commands originating at source device 110, each of the remote devices 120 and 140 needs to have time bases, based upon their uncalibrated clocks 121 and 141, correlated to the source device 110. Note that the term uncalibrated clock is used to indicate that clocks 121 and 141 are not functionally calibrated to the source device 110 prior to the calibration process described herein. Generally, the time base of a remote device is predefined to be an amount of time required to accurately control its target device or devices. For example, if the source device 110 provides timing control information to remote device 120 requiring a resolution of 1 microsecond, the remote device needs to be able to accurately reproduce a 1 microsecond time interval. In accordance with the present invention, the remote device 120 is calibrated to accurately generate a 1 microsecond time base based on the time reference signal generated by the source device 110.

For example, first target device 130 is illustrated to receive control information having a time base of TB1, where TB1 represents a time unit from which all timing control information can be specified, for example (1 microsecond). In accordance with the present disclosure, the time base TB1 is calibrated to a first timing reference signal received from source device 110 by the first remote device 120. Likewise, second target device 150 is illustrated to receive control information having a time base of TB2, where TB2 represents a time unit from which all timing control information for the second target device 150 can be specified, for example (0.5 microseconds). In accordance with the present disclosure, the time base TB2 is calibrated to a second timing reference signal received from source device 110 by the first remote device 120. This is better understood with reference to the timing diagram of FIG. 2.

Figure 2:
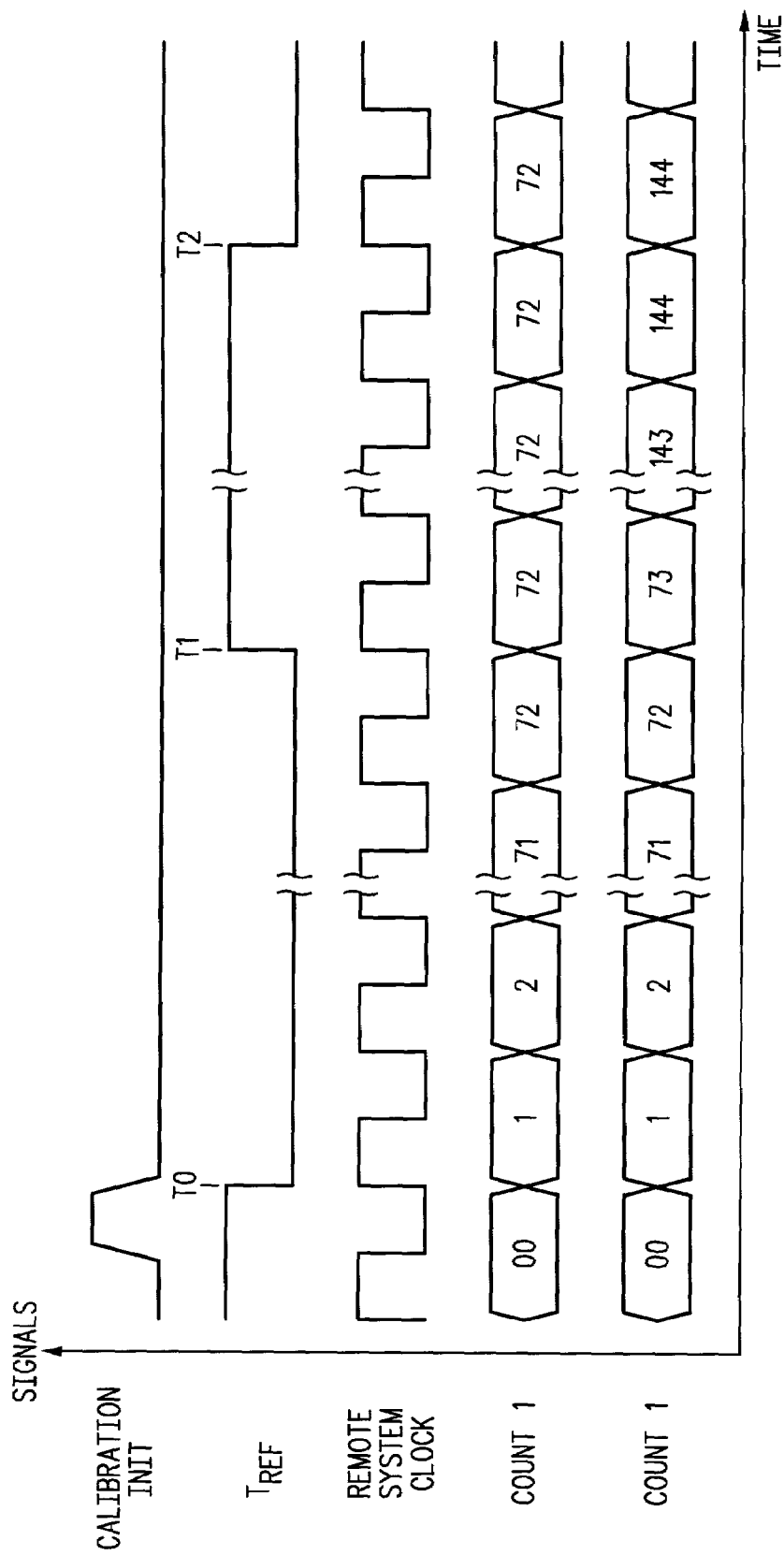
FIG. 2 is a timing diagram illustrating a correlation between clock cycles within a remote device and clock cycles within a source device, according to one embodiment of the present invention.

The timing diagram of FIG. 2 illustrates a specific calibration process. First, a calibration initialization indicator (CALIBRATION INIT) is received at the first remote device 120 from the source device 110. Such an indicator can be a specific command, received in parallel, or serially, which is decoded by the first remote device 120, or a specific control signal, such as a rising or falling signal, received at a dedicated pin of the first remote device 120. The receipt of the calibration initialization indicator occurs as part of a standard communication protocol implemented between the source and remote devices. For example, the calibration initialization indicator can be serially received at the remote device using a standard serial protocol, such as a Serial Peripheral Interface (SPI) protocol, which uses three nodes to serially transmit data, which is well known in the industry.

In response to receiving the initialization indicator 210, the first remote device 120 will prepare to receive a timing reference signal, which will act as a calibration signal. In the embodiment illustrated, a value labeled COUNT1, associated with the first remote device 120, is reset to a known value, such as zero (0). Once COUNT1 is reset, the first remote device 120 waits for receipt of timing reference signal, and more specifically for a specific timing event, such as a pulse, to commence incrementing the value of COUNT.

At time T0, the timing reference value has initiated the awaited for timing event by transitioning from a high state to a low state. On each subsequent rising edge of the remote system clock, after initialization of the timing event, the value of COUNT1 is incremented. In one embodiment, the timing event of the timing reference signal is defined by the low state (pulse) between times T0 and T1, as indicated by COUNT1 of FIG. 2. In the illustrated example, the value of COUNT1 was incremented 72 times indicating 72 rising edges were detected on the REMOTE SYSTEM CLOCK. Note that in other embodiments, the timing event of the timing reference signal can be defined differently, such as between adjacent falling edges at times T0 and T2, which provided a count of 144, as indicated by COUNT2. In addition, it will be appreciated the REMOTE SYSTEM CLOCK can represent a divided clock of a main system clock within the first remote device 120.

Once the timing event is completed, the time base TB1 can be determined based on the predefined duration of the timing event and the number of clock cycles corresponding to the predefined duration. For example, if the desired time base TB1 is 1 microsecond and the predefined, or predetermined, duration of the timing event is eight microseconds, the remote system will correlate the 1 microsecond time base to be the total number of clocks divided by the duration of the timing event in microseconds, or 72 clocks divided by 8 microseconds. This provides a time base of 9 clocks per microsecond based upon the example of FIG. 2. Therefore, when a subsequent timing control command indicates initiating a control signal for a duration of X microseconds, the first remote device 120 can do so by providing a signal having a duration of X*9 remote system clocks. In this manner, an efficient method of calibrating a remote device to a source device is implemented.

Referring back to FIG. 1, it will be appreciated that a time base TB, used by a second remote device 140, can likewise be calibrated to the source device 110 in a similar manner. Note that the time base TB2 can be the same or different as the time base TB1. Likewise, the timing reference signal provided by the source device 110 can be the same or different for each of the remote device 120 and 140. In one embodiment, the predefined duration of the time reference signal is fixed, for example the duration of the timing event can be a fixed eight microseconds. In an alternate embodiment, the duration of the time reference signal is variable, and provided by the source device 110 to a remote device, to indicate a duration of the timing reference signal. For example, the source device can transmit a value indicating the duration of a timing event, where the value would be stored at the remote device to be used during the calibration process. Note, it will be appreciated that when a fixed timing event duration is specified that the actual duration of the timing event can be modified to implement a different time base. For example, if the fixed duration of the timing event is eight microseconds, and a 16 microsecond timing event is actually provided, the remote device will have a count of 144 clocks, which will incorrectly correlate to 18 clocks per microsecond. This has the effect of controlling the duration of the time base, i.e. each "microsecond" or unit of time specified by the source will now be twice as long. Since the source device provides both the timing event and the timing instructions, this relationship can readily be used to adjust or control the value of the time base.

Figure 3:
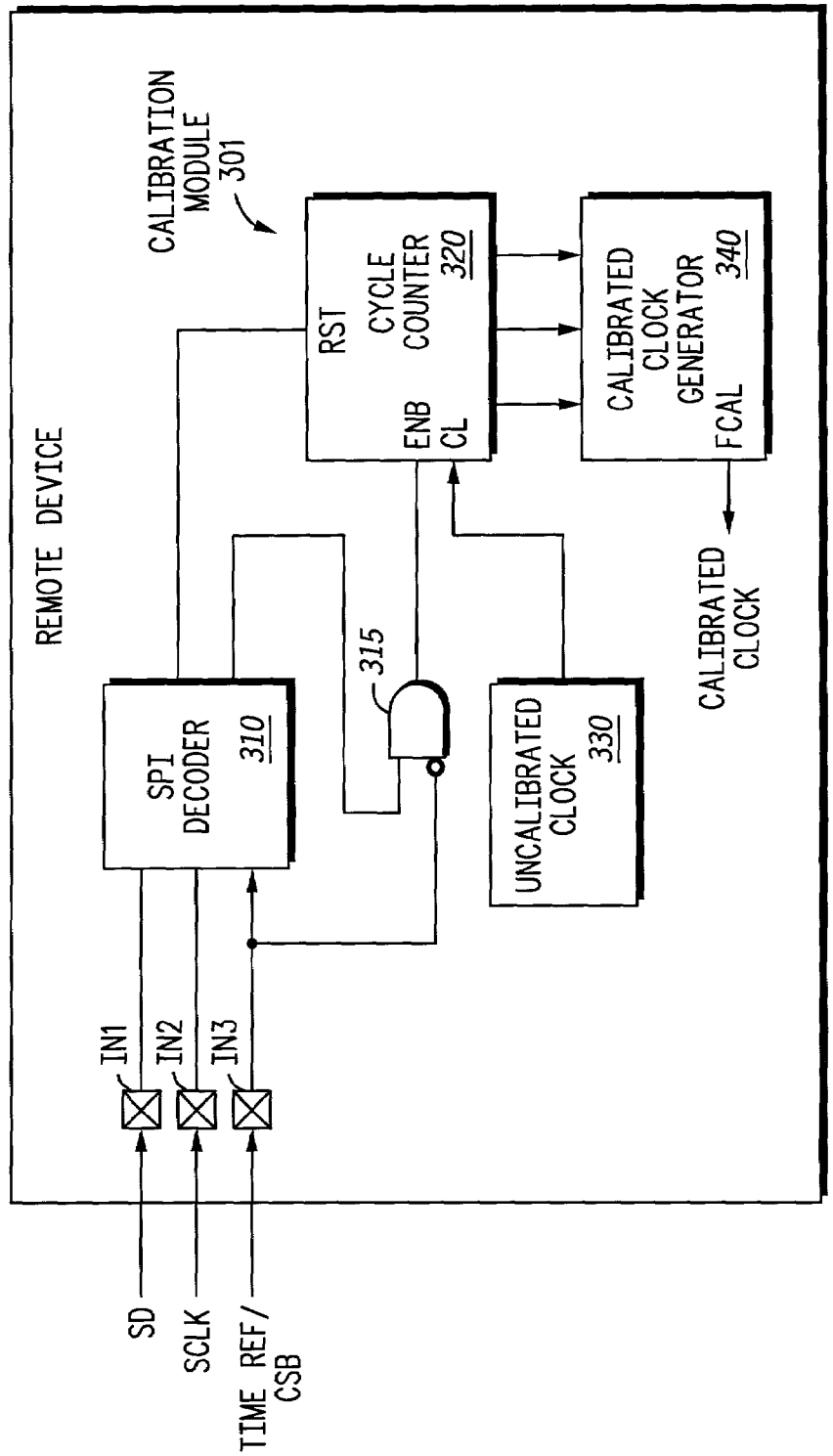
FIG. 3 is a block diagram illustrating a remote device capable of using a time reference signal to produce a control signal calibrated to a source device, according to one embodiment of the present invention.

FIG. 3 illustrates a specific implementation of a calibration module 301, which is analogous to calibration modules 122 and 142 associated with remote devices 120 and 140 respectively. The calibration module includes a serial peripheral interface (SPI) decoder 310, a cycle counter 320, a calibrated clock generator 340, an uncalibrated clock 330, and logic gate 315.

In a first mode of operation, the signals received at SPI decoder 310 provide data in a serial manner and generally conform to an SPI protocol as is commonly known in the industry. Specifically, serial data (SD) is received at input IN1, a serial data clock (SCLK) is received at input IN2, and input IN3 which receives a signal that is a multiplexed signal varying between an enable signal CSB used to enable operation of the SPI decoder 310, and the time reference signal TIMEREF used to provide the timing event used for calibration of the device.

In one embodiment, the data received by signal SD during a serial data transfer is decoded by the SPI decoder 310 to interpret one or more instructions. One such instruction would be a calibration instruction, corresponding to the initialization indicator 210, which once decoded results in the SPI decoder operating in a mode of operation different from other modes of operation in that the signals received at inputs IN1–IN3 are processed differently than when operating in a standard serial communications mode. This mode of operation can be referred to as a count calibration mode.

During the count calibration mode, a signal labeled CLOCK COUNTER RESET is generated by the SPI decoder 310 and provided to cycle counter 320 to reset a count value associated with the cycle counter 320. Also during the count calibration mode a signal labeled CALIBRATION ENABLE is generated by the SPI decoder 310 and provided to the logic gate 315 to allow for subsequent enablement of the cycle counter 320. When in the count calibration mode, a signal received at IN3 does not operate to enable data reception by the SPI decoder 310. Instead, the signal is received at the logic gate 315, and when in an active state results in the cycle counter 320 being incremented based upon the uncalibrated clock 330. The cycle counter 320 will stop incrementing when the timing reference signal received at IN3 signal becomes inactive.

Note that the SPI decoder 310 monitors the signals being received at input IN3, and once the received signal becomes inactive the SPI decoder 310 exits calibration mode, and can begin receiving data in a standard manner. Note, that during the calibration mode, data transitions on the inputs IN1-IN3 can be monitored for controlling events associated with the calibration mode. To this extent, the SPI decoder 310 can be designed to receive a timing reference signal multiplexed onto any of the input pins IN1–IN3.

The count value stored in the cycle counter 320 is used to calibrate operation to the desired time base. For example, the calibrated clock generator 340 can use the count value to provide a calibrated time base, which can be a time base clock. For example, with reference to the example described in FIG. 2, the clock could have a one-microsecond period. In another embodiment, as previously discussed, the count associated with the cycle counter 320 can be used to multiply a received time value to determine a number of uncalibrated oscillator clock cycles needed to control a target device.

Figure 4:
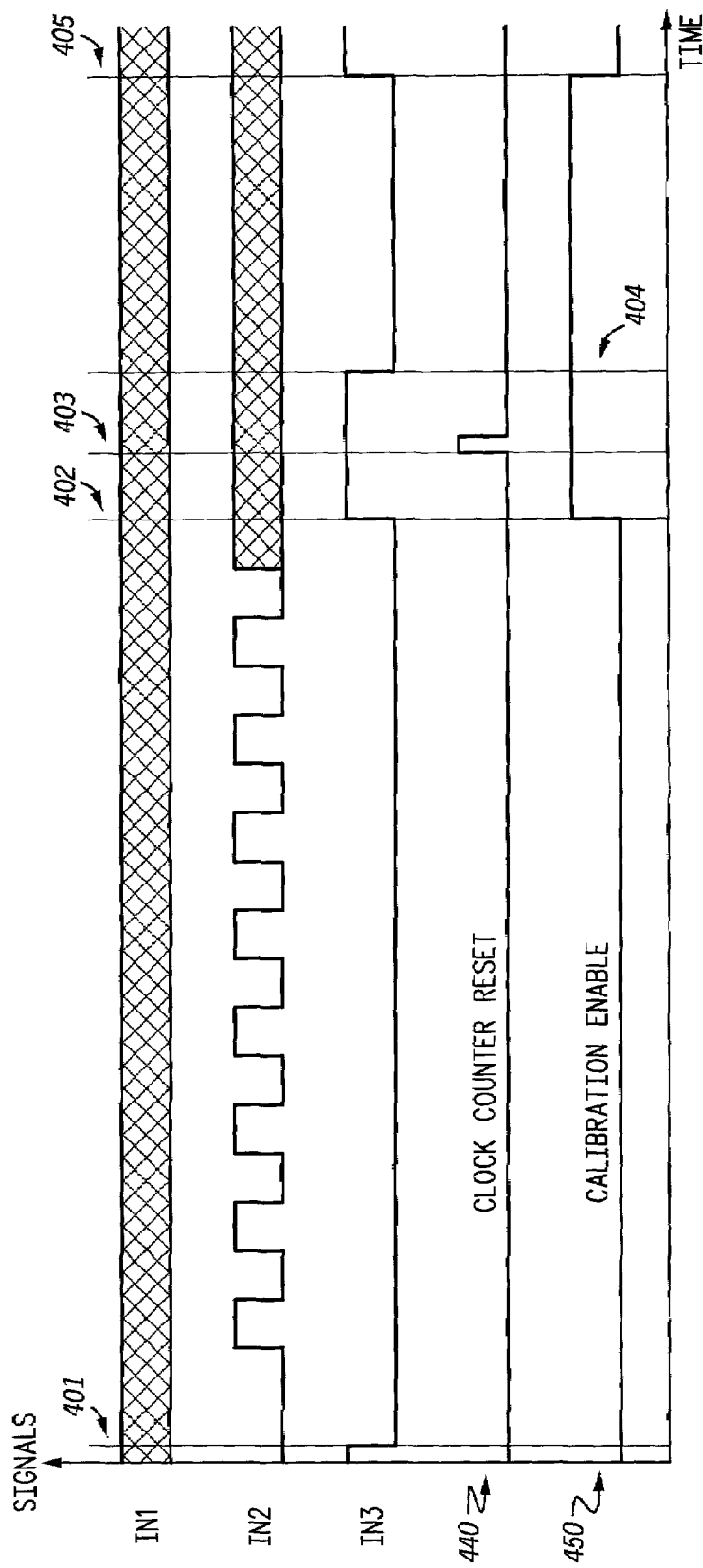
FIG. 4 is a timing diagram used to illustrate a method of using a time reference signal to correlate timing in a remote device to timing in a source device, according to one embodiment of the present invention.

Referring now to FIG. 4, a timing diagram illustrating a specific method of receiving a time reference signal in the system described in FIG. 3 is shown. At time 401, the signal at IN3 represents a first type of signal, such as an enable signal (CSB), which transitions to an active low state to enable reception of serial data at input IN1. While the CSB signal received at IN3 is active, from time 401 to time 402, a bit of data is received at each transition of the clock signal at IN2 based upon the state of IN1. In one embodiment, the command loaded during the period from time 401 to time 402 enables calibration initialization in the remote device. Accordingly, at time 402, once the CSB signal 430 transitions back to a high state, the command sent using the SD signal is interpreted as a calibration enable command and a CALIBRATION ENABLE signal 450 transitions to a high state to allow calibration to be performed in the remote device. A CLOCK COUNTER RESET signal 440 provides a high state pulse at time 403 to reset a counter, such as cycle counter 320, of the remote device. In one embodiment, the counter is reset to a zero state.

In one embodiment, the signal received at IN3 operates as different signal types depending upon a mode of operation. For example, once a calibration enable command is received, the signal received at IN3 no longer operates as an enable signal to a serial communication device, but instead operates as a timing reference signal. For example, at time 404, the signal received at IN3 transitions from a high state to a low state to indicate the beginning of a timing event to be used to calibrate a remote device. Accordingly, incrementation of the counter used to track a number of clock cycles produced by a clock signal used by the remote device begins. In one embodiment, at time 405, when the IN3 signal transitions back to a high state, the timing event of the time reference signal is interpreted as being completed and the counter is stopped. Furthermore, once the IN3 signal transitions back to a high state, the IN3 signal can once again be interpreted as an enable signal. The value stored in the counter 320 (FIG. 3) can be used to identify a number of clock cycles local to the remote device that correlate to the period of time provided through the IN3 signal between times 404 and 405. The value can then be manipulated by the remote device to establish a number of local clock cycles to be associated with numbers of clock cycles specified by the source device, such as source device 110 (FIG. 1).

In the discussed embodiment, the counter 320 is reset to a value of zero. It will be appreciated that many alternate methods of obtaining a count can be implemented. For example, in another implementation the counter 320 can include a free-running cycle counter that is not reset, but instead a current value is stored at the start of the timing event at time 404, and compared to the value of the free running counter when the timing event is completed.

Figure 5:
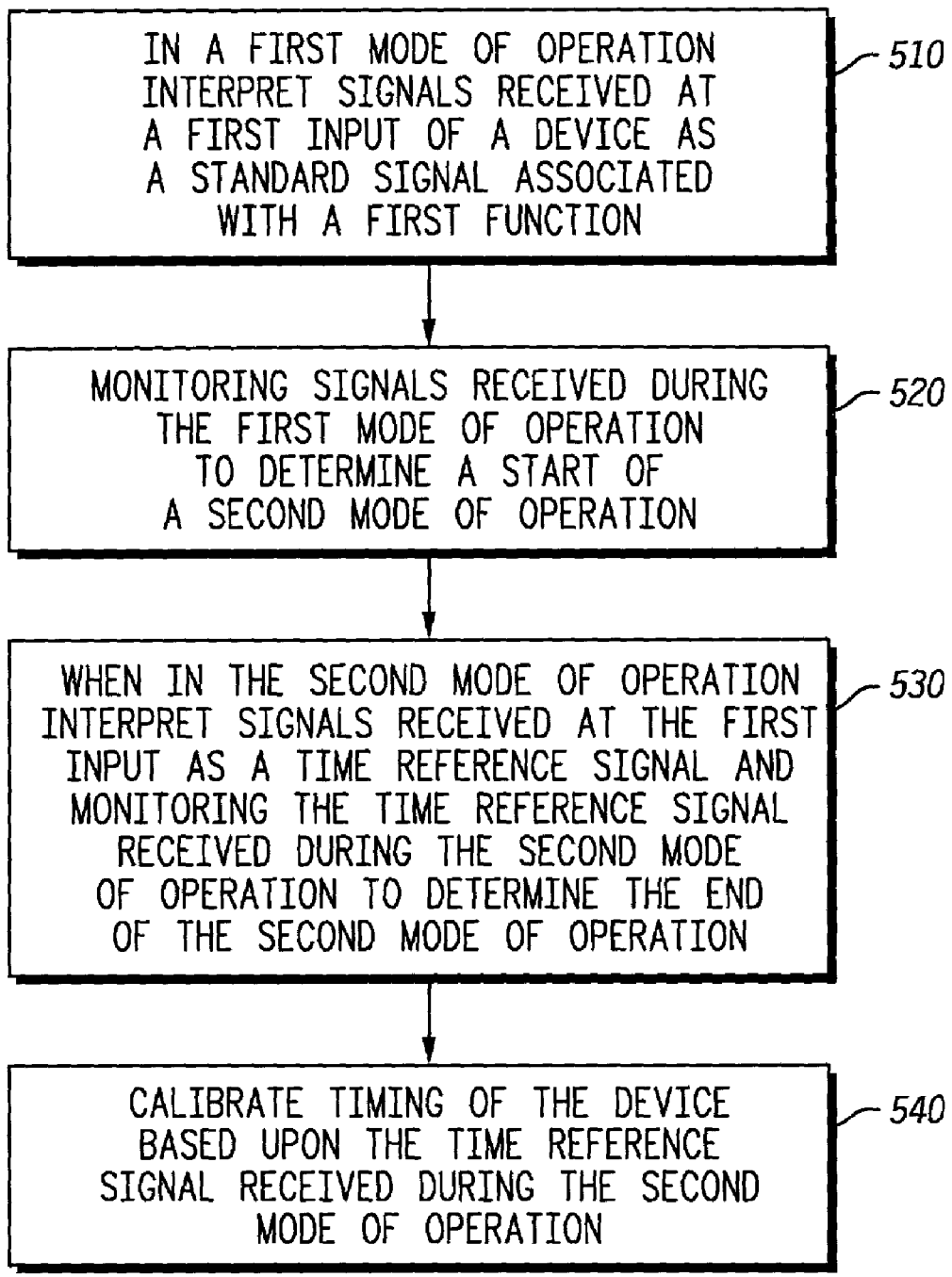
FIG. 5 is a flow diagram illustrating a method of calibrating a remote device to generate signals calibrated to a source device, according to one embodiment of the present invention.

It should be noted that depending upon when time 404 occurs relative to an uncalibrated clock signal of the remote device 120, that a received count can vary by one clock cycle. This variation can result in an error that is dependent upon the number of cycles counted during the calibration processes. By increasing the count, either by using a faster uncalibrated clock or a longer timing event, the error can be reduced Referring now to FIG. 5, a flow diagram illustrating a method of calibrating a remote device to generate timing signals calibrated to timing in a source device is shown, according to one embodiment of the present invention.

At step 510, signals received at a first input node are interpreted as standard signals associated with a first function. For example, signals received at the first input node can be used to enable a serial communication device, to clock the serial communication device, or to provide data to such a device. In other embodiments, standard signals associated with components other than communications protocols are anticipated.

At step 520, the signals received during the first mode of operation are monitored to determine when a second mode of operation begins. As previously discussed, data received can be interpreted to determine when a calibration sequence is beginning.

At step 530, the signals received at the first input are interpreted as time reference signals associated with a second function different than the first function or type. For example, the signal received can provide a timing event that is used to correlate a local, uncalibrated, clock to the system providing the time reference signal. In addition, the time reference signal is monitored to determine an end of the time reference signal. For example, if the time reference clock is known to be a low pulse, or a sequence of pulses, monitoring of the time reference signal can be used to indicate when the second mode of operation is completed.

At step 540, calibration of the timing of the device is accomplished using the time reference signal received during the second mode of operation.

Figure 6:
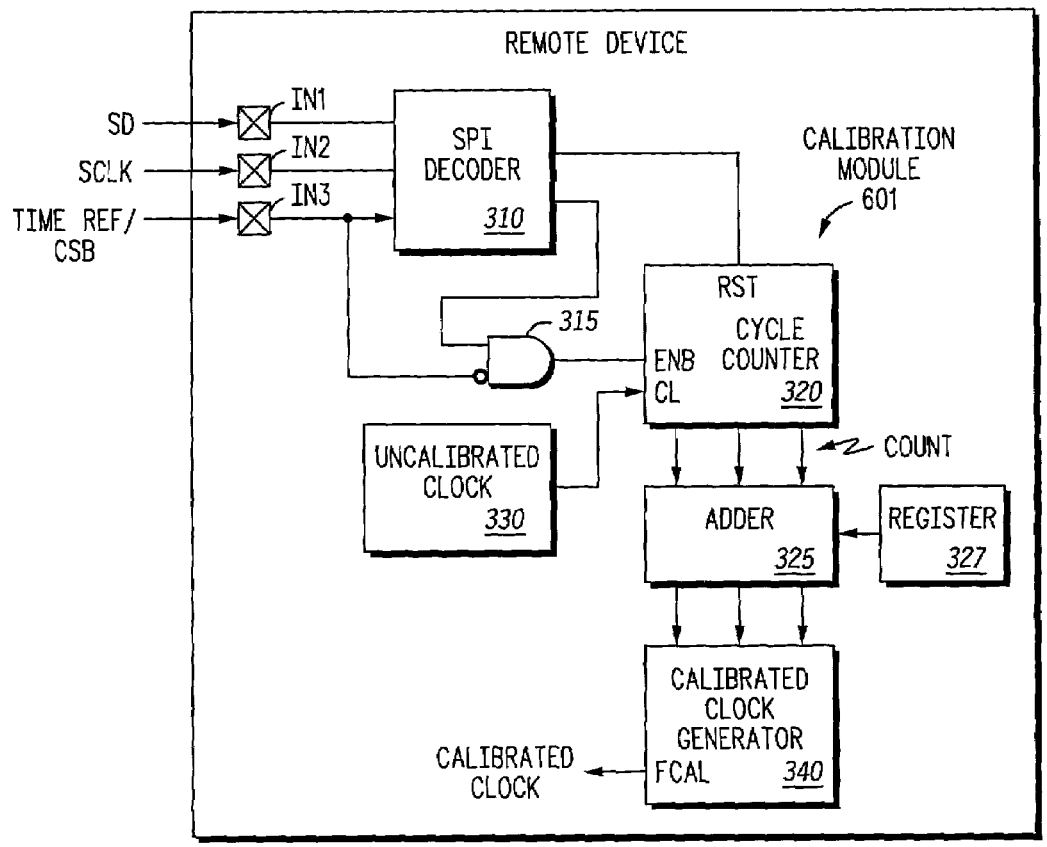
FIG. 6 is a block diagram illustrating a remote device capable of adjusting a time base to alter calibrated clock signal properties, according to one embodiment of the present invention.

Referring now to FIG. 6, a block diagram illustrating a specific implementation of a calibration module 601 is illustrated having components to modify a value of a calibrated time base is shown. Calibration module 601 operates similar to calibration module 301 of FIG. 3. In one embodiment, SPI decoder 310 receives a calibration instruction which results in the calibration module 301 operating in a calibration mode. As previously discussed, a timing event received at IN3 is used to enable counting by cycle counter 320 which uses uncalibrated clock 330.

A count based on the uncalibrated clock 330 is used to identify a desired time base. For example, with reference to the example described in FIG. 2, the source clock can provide an eight-microsecond timing event which enables the counter 320 to obtain a count corresponding to the number of uncalibrated clock cycles that occur during the eight microsecond timing event. Note, that this count will normally be divided to specify a specific time base, such as 1 microsecond However, due to the asynchronous nature of the uncalibrated clock 330 with reference to the timing event generated based on the source clock, clock counts may be missed. However, even with the possibility of missed counts, the calibration module 306 is capable of calibrating a time base to the source device to +/−10%, or better by correlating its own uncalibrated clock to the known timing event. The +/−10% results from clock signals that may be missed due to the asynchronous nature of the signals. Note, that clock count could in effect be added as well depending upon the exact relationship between the uncalibrated clock 330 and the timing event.

Figure 7:
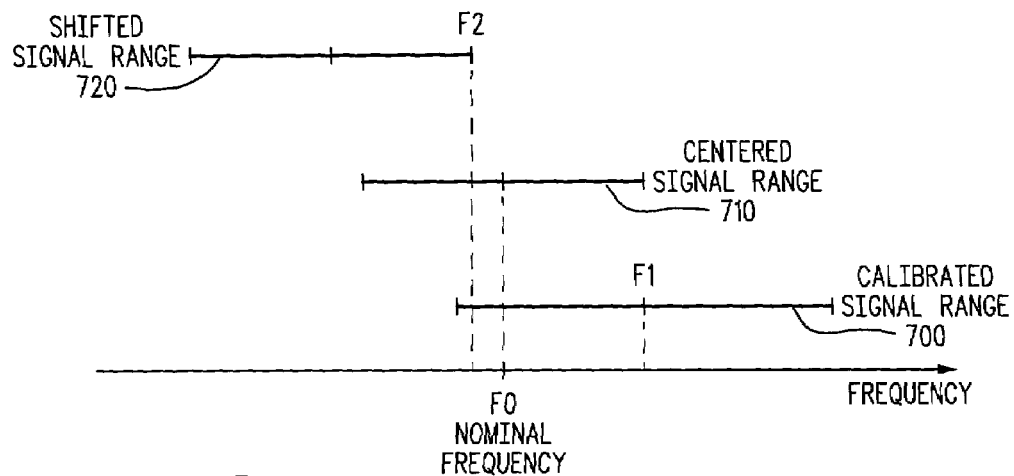
FIG. 7 is a frequency plot used to identify frequency distributions in generated clock signals, according to one embodiment of the present invention.

As a result of the asynchronous nature of the timing event signal and the uncalibrated clock the precise number of counts for a specific timing event is indeterminist, resulting in a possible frequency variation. This results in a nominal calibrated frequency range that can occur within some error of the desired nominal frequencies, generally this error will be within +/−10% of a desired nominal time. For example, calibrating the timing event to an 8 MHz +/−40% uncalibrated clock 330 results in an indeterminate count due to the asynchronous relationship between the timing event and the uncalibrated clock. Referring to FIG. 7 illustrates a frequency range 700 centered at frequency F1, where the range 700 is the range of possible frequencies for a specific calibration process. It will be appreciated that center frequency F1 will generally be at a frequency higher than the desired nominal frequency F0 because asynchronous operation will generally result in missing counts, which translates to a higher final frequency.

FIG. 6 illustrates an adder 325 which can be used to shift the center frequency F1. For example, the adder 325 can be used to add or subtract a count value stored in a register 327 from the count value identified by cycle counter 320. A modified count value generated by adder 325 can be provided to the calibrated clock generator 340 to adjust timing of the calibrated clock signal. For example, by adding clock counts to the value provided by the cycle counter 320, the adder 325 can correct for missed counts, which will result in a lower center frequency (i.e. shift F1 to the left). The added clock counts can reduce the center frequency of a distribution associated with the calibrated clock signal.

For example, with reference to FIG. 7, adding cycle counts to the count value can shift the time base to provide a distributed frequency range 710 that is centered, or more closely centered about the desired nominal frequency F0. Furthermore, in some embodiments, it may be desired to ensure the generated calibrated clock signal is below or above a particular frequency. For example, cycle counts can be added to ensure the centered frequency distribution of the time base has a shifted signal range 720 that has a maximum frequency of F2, which is below the desired nominal frequency of F0.

Accordingly, register 327 can be set from 0 to N counts to modify the number of cycles identified through cycle counter 320. Furthermore, in one embodiment, adder 325 can be programmed to either add or subtract the number of counts stored in register 327 from the counts identified by cycle counter 320. Generally, the value stored in register 327 will be loaded via the SPI nodes (IN1-IN2).

The systems described herein may be part of an information handling system. The term "information handling system" refers to any system that is capable of processing information or transferring information from one source to another. An information handling system can be a single device, such as a computer, a personal digital assistant (PDA), a hand held computing device, a cable set-top box, an Internet capable device, a cellular phone, and the like. Alternatively, an information handling system can refer to a collection of such devices. It should be appreciated that the system described herein has the advantage of calibrating timing in a remote device to timing in a source device without requiring dedicated synchronization hardware or clock signal ports.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
receiving a standard signal at an input of a first device, wherein the standard signal is associated with a first mode of operation;
receiving, during a second mode of operation different from the first mode of operation, at the input of the first device, a first time reference signal from a second device; and
correlating a timing event of the first time reference signal to an internal clock of the first device to determine a time base relative to a duration of time used to receive the first time reference signal.

2. The method as in claim 1, further including receiving, at the first device, a first command from the second device and further wherein receiving the first time reference signal and correlating a timing event of the first time reference signal are performed in response to the step of receiving the first command.

3. The method as in claim 2, wherein receipt of the first command initiates the second mode of operation.

4. The method as in claim 2, wherein the standard signal includes a signal to enable receipt of the first command.

5. The method as in claim 2, wherein the standard signal includes the first command.

6. The method as in claim 2, wherein the first command is received serially.

7. The method as in claim 6, wherein the standard signal includes a serial clock provided to establish times when bits of the first command are valid, and further wherein the first time reference signal is associated with the serial clock.

8. The method as in claim 1, wherein the first device includes a single device of a plurality of remote devices and further wherein at least some devices of the plurality of remote devices are capable of performing the steps.

9. The method as in claim 1, wherein the time base is determined by counting a number of cycles of the internal clock of the first device during a period of time identified using the first time reference signal.

10. The method as in claim 9, further including modifying a count representing the number of cycles used to determine a time base.

11. The method as in claim 10, wherein modifying the count includes using a stored register value to modify the count representing the number of cycles.

12. The method as in claim 1, wherein the first time reference signal is part of a signal generated by the second device and is identified between two transitions of the signal generated by the second device.

13. The method as in claim 12, wherein the first device initiates the first mode of operation in response to the second transition of the first time reference signal.

14. The method as in claim 1, further including providing a control signal of a desired rate based on the time base.

15. The method as in claim 1, wherein the first mode of operation is associated with a receipt of data according to a communications protocol.

16. The method as in claim 15, wherein the communications protocol includes a protocol from the group comprising a standard communications protocol and a proprietary communications protocol.

17. The method as in claim 15, wherein the communications protocol includes a serial communications protocol.

18. The method as in claim 1, further including shifting a frequency associated with the time base based upon a predetermined value.

19. A system comprising:
a source device having:
a source clock to generate a source clock signal;
an output node to provide a first time reference to an input port of a first remote device;
the first remote device having:
an input node coupled to the output node of said source device to receive a standard signal in a first mode of operation and said first time reference in a second mode of operation;
a counter to identify a number of clock cycles generated by an internal clock for a duration specified through said first time reference, during said second mode of operation;
a control signal generator to determine a time base based on said number of clock cycles;
an output node to provide to a target device a control signal based on said time base;
said internal clock; and
said target device having an input node coupled to the output node of said first remote device, said input node receiving said control signal and said target device performing a function based on said control signal.

20. The system as in claim 19, wherein said source device further includes a calibration control module, wherein said calibration control module is used to generate a calibration enable command to initiate the second mode of operation in said first remote device.

21. The system as in claim 20, wherein said calibration enable command is further used to reset said number of clock cycles identified by said counter.

22. The system as in claim 20, wherein said calibration enable command includes a serial command.

23. The system as in claim 22, wherein said standard signal includes said calibration enable command.

24. The system as in claim 22, wherein said first remote device further includes a serial communications decoder to receive said serial command, said serial communications decoder including a serial data node to receive said serial command, a serial clock node to receive a serial communications clock, and an enable port to receive a chip select signal to enable serial communications.

25. The system as in claim 24, wherein said standard signal includes one of said serial clock or said chip select bar signal.

26. The system as in claim 19, wherein said target device includes a stepper motor and further wherein a motion of a rotor of said stepper motor is based on said control signal.

27. The system as in claim 19, wherein said duration of said first time reference is based on a time between two transitions of said first time reference.

28. The system as in claim 27, wherein said two transitions include two transitions from the group comprising two rising edges and two falling edges.

29. The system as in claim 27, wherein the two transitions include a rising edge and a falling edge.

30. The system as in claim 19, wherein said counter includes a free running system counter.

31. The system as in claim 19, wherein said first remote device further includes an adder used to modify the number of clock cycles identified using said counter.

32. The system as in claim 31, wherein said first remote device further includes a register to store a value used by said adder to modify the number of clock cycles identified using said counter.

33. A system comprising:
a serial communications interface having:
a serial data node to receive serial commands, wherein said serial data node is used to receive a command to initiate a second mode of operation;
a serial clock node to receive a signal to clock in bits at the serial data node;
an enable node to receive a first enable signal to enable serial communications;
a signal node to receive a standard signal in a first mode of operation and a time reference signal in the second mode of operation, wherein a completion of the time reference signal is used to initiate the first mode of operation;
a counter to track a number of clock cycles generated by a local clock, said counter having:
a reset node to initialize a count of the number of clock cycles;
an enable node to receive a second enable signal to enable a counting of the clock cycles;
an output node to provide a count of the number of clock cycles;
a control signal generator to generate a control signal based on the count of the number of clock cycles, said control signal generator having an input node coupled to the output node of the counter to receive said count of the number of clock cycles; and
said local clock to generate said clock cycles.

34. The system as in claim 33, wherein said enable node of the counter is coupled to the enable node of said serial communications interface.

35. The system as in claim 33, further including an adder having an input node coupled to the output node of said counter and said adder further having an output node coupled to the input node of said control signal generator, said adder used to modify said number of clock cycles.

36. A method comprising:
receiving a first signal of a first operational type at an input of a first device, wherein the first signal is associated with a first mode of operation;
receiving at the input, during a second mode of operation, a second signal of a second operational type, wherein the first operational type is different than the second operational type; and
correlating a timing event received as part of the second signal to an internal clock of the first device to determine a time base relative to the first time reference signal.

37. The method as in claim 36, wherein the first operational type is associated with a communications protocol.

38. The method as in claim 37, wherein the communications protocol is associated with a transmission protocol from the group comprising a standard communications protocol and a proprietary communications protocol.

39. The method as in claim 37, wherein the communications protocol is associated with a serial communications protocol.

40. The method as in claim 37, wherein the first signal is associated with a signal comprising the group of a transmitted command, a data clock signal, and a chip select signal.

* * * * *